United States Patent [19]

Yagi et al.

[11] Patent Number: 4,494,504

[45] Date of Patent: Jan. 22, 1985

[54] STRATIFIED BURN INTERNAL COMBUSTION ENGINE

[75] Inventors: Shizuo Yagi; Junji Otani; Isao Fujii; Hiroshi Kogure, all of Saitama, Japan

[73] Assignee: Honda Giken Kogyo Kabushiki Kaisha, Tokyo, Japan

[21] Appl. No.: 386,611

[22] Filed: Jun. 9, 1982

Related U.S. Application Data

[63] Continuation of Ser. No. 91,874, Nov. 7, 1979, abandoned.

[30] Foreign Application Priority Data

Nov. 9, 1978 [JP] Japan .................................. 53-137274

[51] Int. Cl.³ ............................................ F02M 35/10
[52] U.S. Cl. ..................................... 123/308; 123/432; 123/442; 123/587
[58] Field of Search ................ 123/274, 308, 430, 432, 123/442, 520, 585, 587

[56] References Cited

U.S. PATENT DOCUMENTS

| 3,556,060 | 1/1971 | Henry-Biabaud | 123/432 |
| 3,830,206 | 8/1974 | Asaka et al. | 123/274 |
| 3,910,248 | 10/1975 | Nakagawa | 123/274 |
| 3,913,545 | 10/1975 | Haase et al. | 123/520 |
| 4,173,203 | 11/1979 | Nakajima et al. | 123/432 |
| 4,192,265 | 3/1980 | Amano et al. | 123/308 |

FOREIGN PATENT DOCUMENTS

| 2437265 | 2/1976 | Fed. Rep. of Germany | 123/432 |
| 0210887 | 10/1940 | Switzerland | 123/432 |

*Primary Examiner*—Parshotam S. Lall
*Assistant Examiner*—W. R. Wolfe
*Attorney, Agent, or Firm*—Lyon & Lyon

[57] ABSTRACT

Controlled amounts of relatively rich mixture and relatively lean mixture are supplied separately to a combustion chamber of an internal combustion engine. The position of the intake valves, exhaust valve and spark plug are such that the rich mixture tends to remain near the spark plug during the compression stroke of the engine and does not disperse throughout the lean mixture. At the time of ignition enriched mixture near the spark plug ignites readily and the flame propagates into and through the lean mixture which fills the remainder of the combustion chamber. Several constructions are disclosed to achieve the desired mixture ratios for various operating conditions of the engine.

18 Claims, 20 Drawing Figures

STRATIFIED BURN INTERNAL COMBUSTION ENGINE

This is a continuation of application Ser. No. 091,874, filed Nov. 7, 1979, now abandoned.

This invention relates to internal combustion spark ignition piston engines and is particularly directed to engines of this type in which a stratified burn takes place upon ignition of an enriched mixture by means of a spark plug.

During each intake stroke a relatively small amount of relatively rich mixture is introduced through a first intake valve port at relatively low speed into the combustion chamber. At the same time a relatively large amount of relatively lean mixture is introduced into the same combustion chamber through a second intake valve port at relatively high speed. This forms stable stratification of two different mixtures. During the subsequent compression stroke the rich mixture remains in the vicinity of the first intake valve port and is ignited by a spark plug for reliable initiation of the burning. A strong flame thus produced then ignites the lean mixture in the remaining portion of the combustion chamber even though the lean mixture may be too lean to be reliably ignited directly from a spark plug. Thus, by such stratified combustion the total air-fuel ratio of the two mixtures may be leaner than the stoichiometric air-fuel ratio, and as a result it is possible to reduce the emission of CO and HC as well as to improve the indicated specific fuel consumption. Furthermore, the combustion takes place separately for rich mixture and lean mixture, thereby controlling generation of $NO_x$.

Other and more detailed objects and advantages will appear hereinafter.

Figure 1:
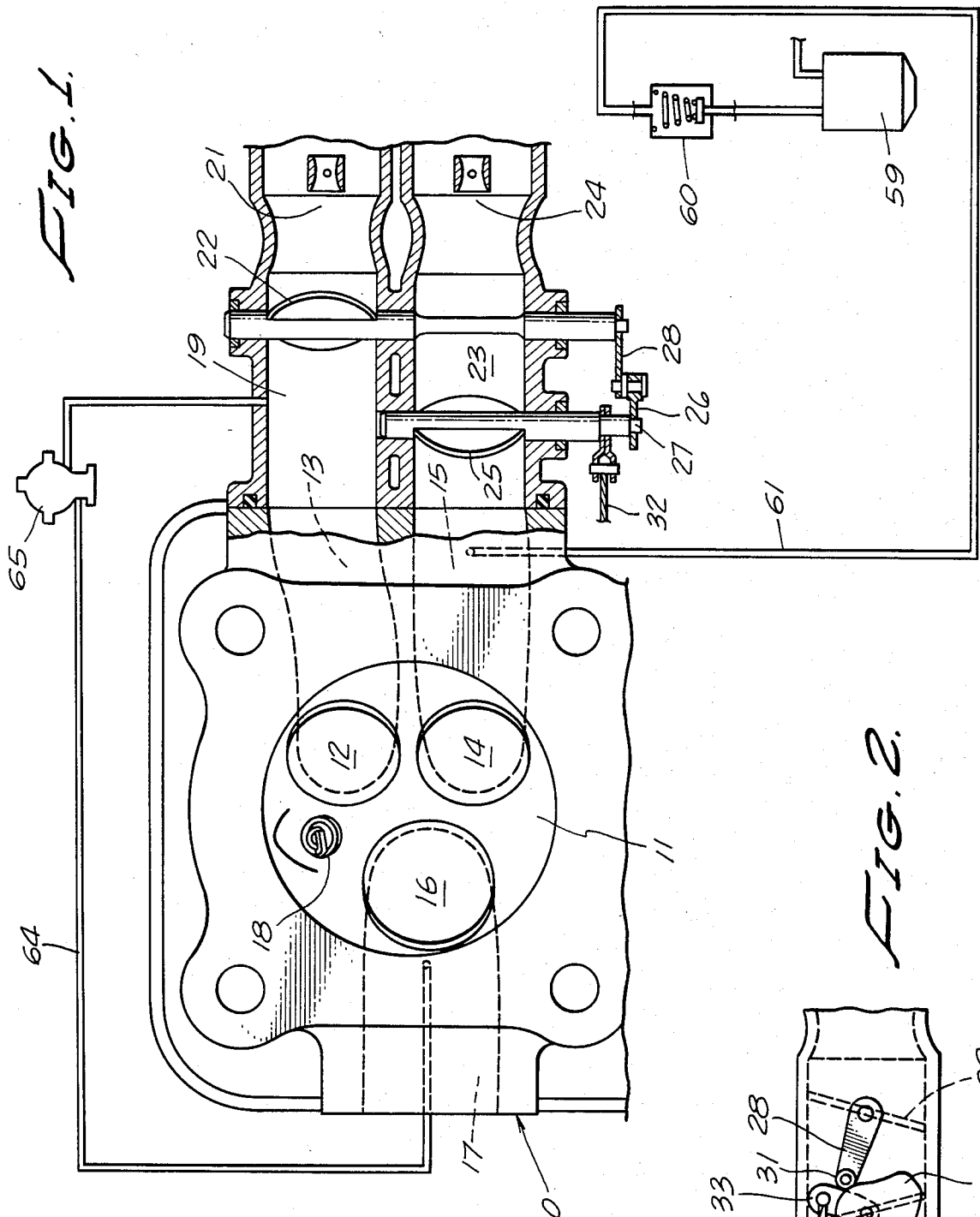
FIG. 1 is a bottom view partly in section showing a preferred embodiment of this invention.
Figure 2:
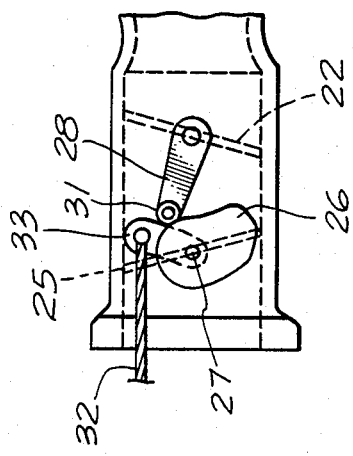
FIG. 2 is a side elevation partly broken away showing a portion of FIG. 1.

Referring to the drawings, the preferred form of the invention shown in FIGS. 1 and 2 concerns an internal combustion spark ignition piston engine generally designated 10. The combustion chamber 11 is formed in the engine head at one end of a cylinder, not shown. On one side of the combustion chamber 11 is a first intake valve 12 of conventional form controlling flow into the combustion chamber through a first intake valve port 13. Adjacent the first intake valve 12 and on the same side of the combustion chamber 11 is a second intake valve 14 controlling flow into the combustion chamber 11 through a second intake valve port 15. An exhaust valve 16 on the other side of the combustion chamber 11 controls flow of exhaust gases through the exhaust valve port 17. A spark plug 18 has an electrode extending into the combustion chamber 11 and positioned near to the first intake valve 12.

The first intake valve port 13 is connected through first intake passage 19 to a first mixture source 21 of a carburetor. A first throttle valve 22 controls flow of a rich air-fuel mixture through the first intake passage 19. The second intake valve port 15 is connected through a second intake passage 23 to a second mixture source 24. Flow of relatively lean mixture from the second mixture source through the second intake passage 23 is controlled by the second throttle valve 25.

In accordance with this invention, operations of the first throttle valve 22 and the second throttle valve 25 are controlled so that intake of air, at least in the range of low loads of the engine, is set as follows: First, the air weight $G_1$ introduced into the combustion chamber 11 through the first intake valve port 13 during the intake stroke of the engine is set to be smaller as compared with the air weight $G_2$ introduced into the combustion chamber 11 through the second intake valve port 15. Stated in another form:

$$G_1 < G_2$$

In other words, relatively rich mixture introduced through said first intake valve port 13 is controlled to be relatively small in amount, while lean mixture introduced through the second intake valve port 15 is controlled to be relatively large in amount.

Figure 3:
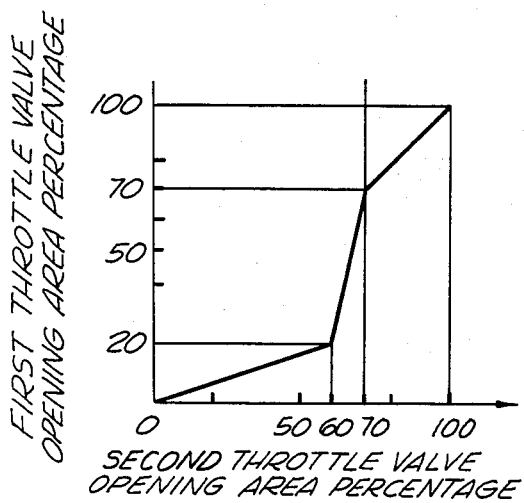
FIG. 3 is a graph showing the relationship of opening area percentages of the first and second throttle valves shown in FIG. 1.
Figure 4:
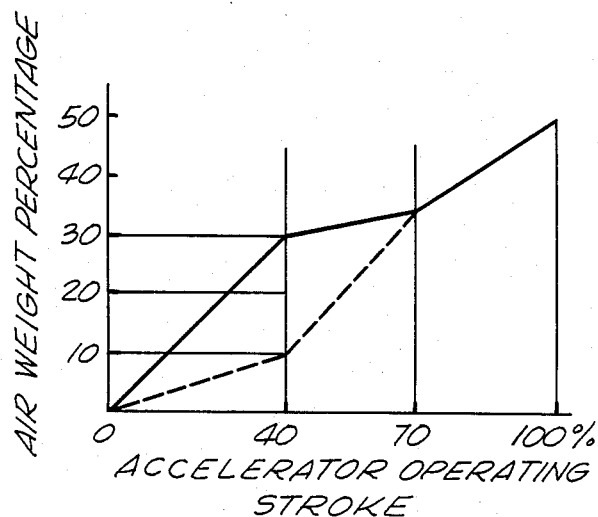
FIG. 4 is a graph showing the relationship of air weight percentage to the accelerator operating stroke.

The controlling means may comprise a cam 26 fixed on the shaft 27 carrying the second throttle valve 25. A lever 28 fixed on the shaft 29 carrying the first throttle valve 22 is provided with a follower roller 31 which engages the outer surface of the cam 26. A throttle wire 32 is attached to a crank arm 33 fixed to the throttle shaft 27. When the second throttle valve 25 is opened gradually by the throttle wire 32, the first throttle valve 22 also opens. The relation of the throttle valve movements is shown in FIG. 3. Thus, in the range of low load to medium load of the engine 10, the relation of the relatively small opening area of the first throttle valve 22 to the relatively large opening area of the second throttle valve 25 is shown. FIG. 4 shows the variation percentages of the aforementioned $G_1$ and $G_2$ in such operations, the relation being $G_1 < G_2$ at low load to medium load.

Figure 5:
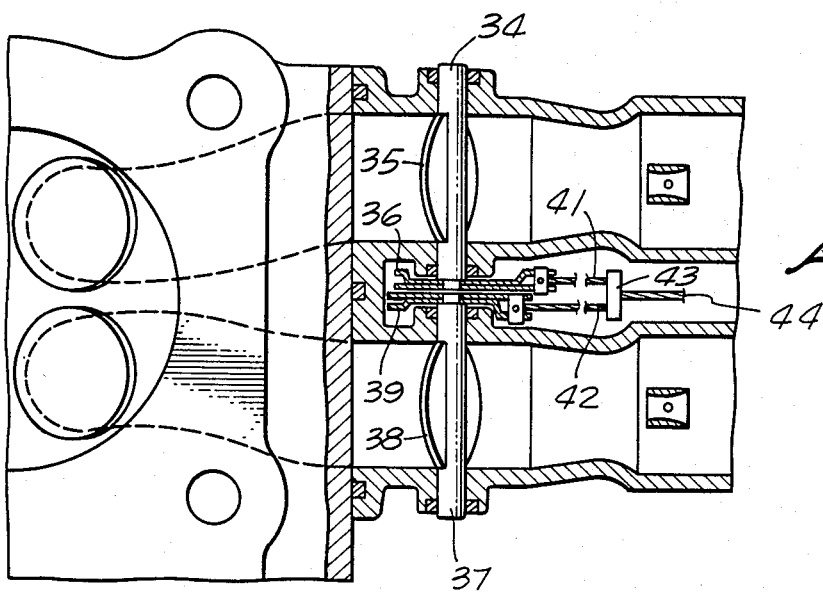
FIG. 5 is a bottom view similar to FIG. 1 showing a first modification.
Figure 6:
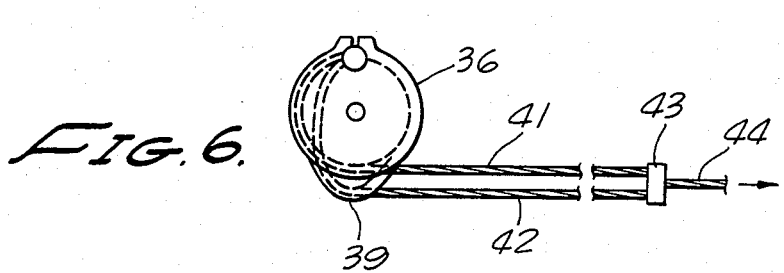
FIG. 6 is a side elevation showing a portion of FIG. 5.

In this case the relation of $G_1$ to $(G_1+G_2)$, that is, $G_1/(G_1+G_2)$ is within the range of 25% to 50%. The means for controlling the relative air weight is not limited to the cam and follower construction shown in FIGS. 1 and 2, but may take another form such as that shown in FIGS. 5 and 6, for example. Fixed to the shaft 34 for the first throttle valve 35 is a wire drum 36. Similarly, fixed to the shaft 37 for the second throttle valve 38 is a wire drum 39. Cables 41 and 42 are secured to the wire drums 36 and 39, respectively, and are joined to a cross bar 43 fixed to one end of the throttle wire 44 which is connected with accelerator. The peripheral configuration of each drum 36 and 39 is chosen so as to regulate the opening movement of the first throttle valve 35 with respect to the opening movement of the second throttle valve 38.

Figure 7:
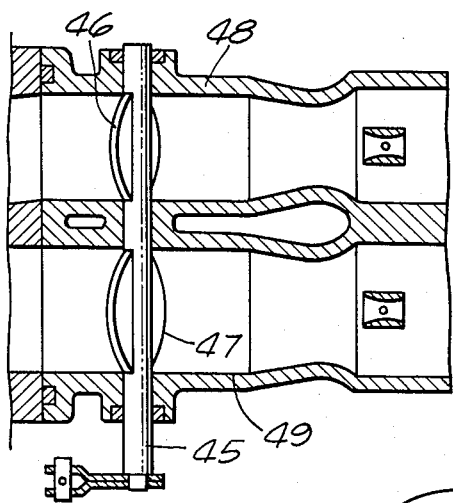
FIG. 7 is a fragmentary sectional plan view showing a second modification.

In the form of the invention shown in FIG. 7, only one throttle shaft 45 is employed, and the first throttle valve 46 and the second throttle valve 47 are both mounted upon it. The bore diameter 48 for the first throttle valve 46 is made smaller than the bore diameter 49 for the second throttle valve 47 to cause lower flow rate past throttle valve 46 as compared to the flow rate past throttle valve 47.

Also, in accordance with this invention, assuming that the opening area of the first throttle valve 22 (FIG. 1) at each engine load to be $A_{TH1}$, and that the effective opening area of said second throttle valve 25 is $A_{TH2}$, and furthermore, assuming that the effective sectional area of the first intake valve port 13 to be $A_{V1}$ and that of said second intake valve port 15 is $A_{V2}$, the relation of $A_{TH1}/A_{V1} < A_{TH2}/A_{V2}$ is caused to be valid. Thus, $A_{TH1}/A_{V1}$ corresponds to the flow rate of rich mixture introduced through the first intake valve port 13, and $A_{TH2}/A_{V2}$ corresponds to that for the second intake valve port 15. Accordingly, the flow rate of rich mixture introduced through the first intake valve port 13 is controlled to be relatively low, and the flow rate of lean mixture introduced through the second intake valve port 15 is relatively high.

With the control of air weight and flow rate as described above, the engine as a whole operates as follows: During intake strokes of the engine, through the second intake valve port 15 lean mixture is supplied in large quantities and at high speed and is introduced into the lower portion of the combustion chamber 11. At the same time rich mixture is delivered in small quantities through the first intake valve port 13 and remains in the upper portion of the combustion chamber 11. Accordingly, the rich mixture does not diffuse throughout the combustion chamber 11 but remains in the upper portion and in the vicinity of the first intake valve port 13 near the spark plug 18, while the lower portion of the combustion chamber 11 is occupied by the relatively lean mixture. During the subsequent compression and expansion strokes of the engine the rich mixture is ignited by the spark plug 18, its flame propagating successively into the lean mixture below to burn it, accomplishing stratified combustion.

Figure 8:
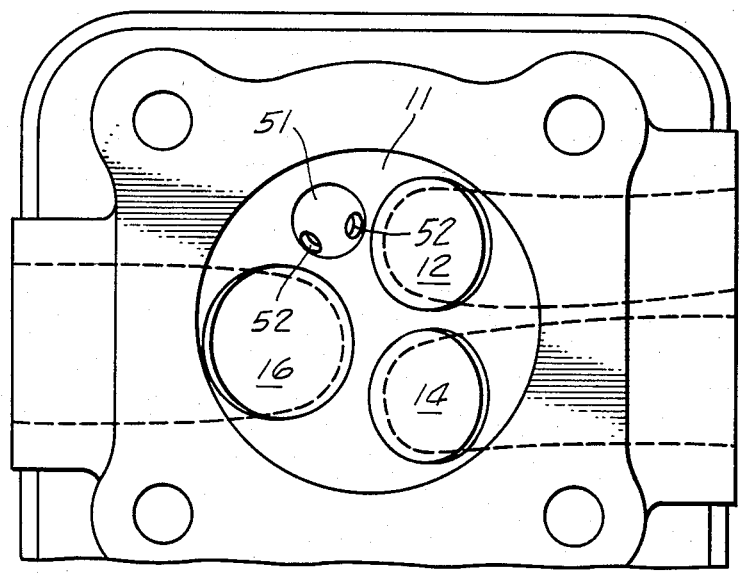
FIG. 8 is a bottom plan view showing the position of an apertured cover for the spark plug electrode.
Figure 18:
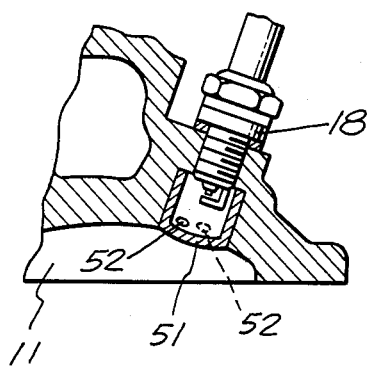
FIG. 18 is a sectional detail showing the spark plug cover as shown in FIG. 8.

The spark plug 18 is positioned so that its electrode is exposed in the combuston chamber 11, as shown in FIG. 1, or as shown in FIGS. 8 and 18, is covered by a shell or enclosure 51 having apertures 52 communicating with the combustion chamber 11.

When the minimum effective sectional area or the sectional area of the venturi, for instance, of the first intake passage 19 is assumed to be $A_{P1}$ and that of the second intake passage 23 is assumed to be $A_{P2}$:

$$A_{V1}/A_{V2} \approx A_{P1}/A_{P2}$$

is preferred, whereby there is insured a sufficient amount of mixture intakes, particularly in the high load range of the engine, so that its power output is increased.

Figure 9:
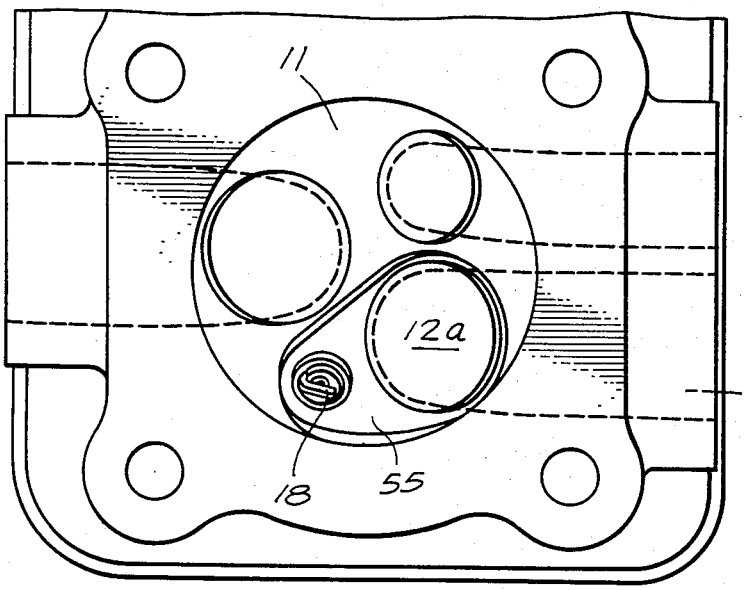
FIG. 9 is a bottom plan view showing a modified form of combustion chamber.

Furthermore, in accordance with this invention, as shown in FIG. 9, for example, the first intake valve port 53 may be relatively large in diameter. In other words, $A_{V1} > A_{V2}$, whereby the flow rate of rich mixture introduced through first intake valve port 53 may be further reduced. Also, as shown in FIG. 10, for example, it is preferred that the maximum lift $H_1$ of the first intake valve 12 is larger as compared to the maximum lift $H_2$ of the second intake valve 14, whereby it is possible to introduce large quantities of rich mixture particularly in the high load range, enabling the engine power output to be increased.

Figure 11:
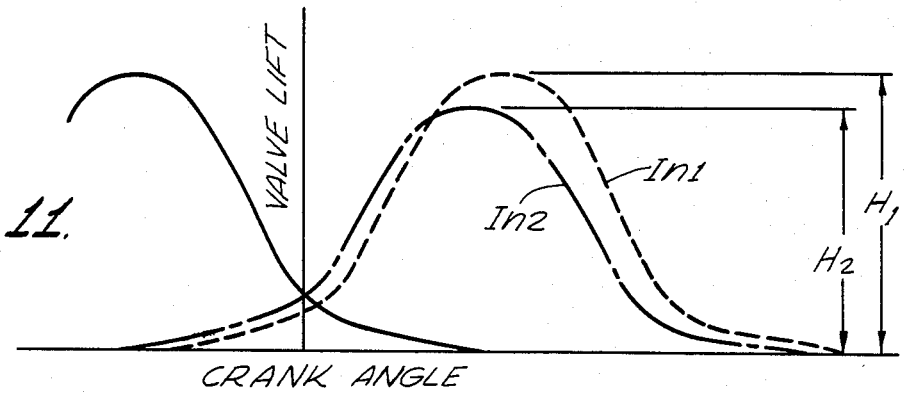
FIG. 11 is a diagram showing valve opening characteristics.

Furthermore, timing for the opening of the first intake valve 12 and the timing for the opening of the second intake valve 14 are indicated in FIG. 11 by the lines $In_1$ and $In_2$, respectively. It is preferred that the first intake valve 12 opens after the second intake valve 14 opens, which acts to reduce somewhat the introduction of such mixture. In this case, the first intake valve 12 starts to open before top dead center.

Figure 13:
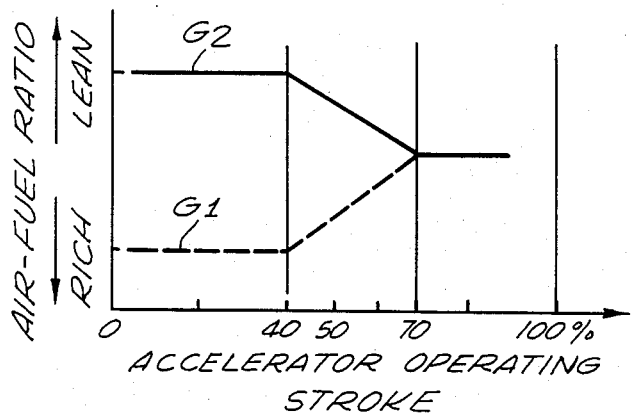
FIG. 13 is a diagram showing relationship of the air-fuel ratio to the accelerator operating stroke.
Figure 19:
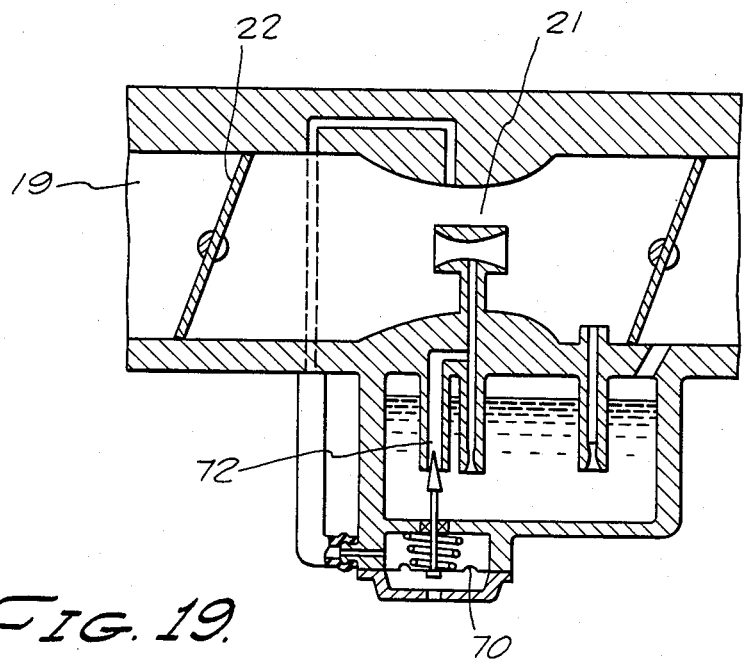
FIG. 19 is a side elevation of another embodiment of a carburetor shown in FIG. 1.
Figure 20:
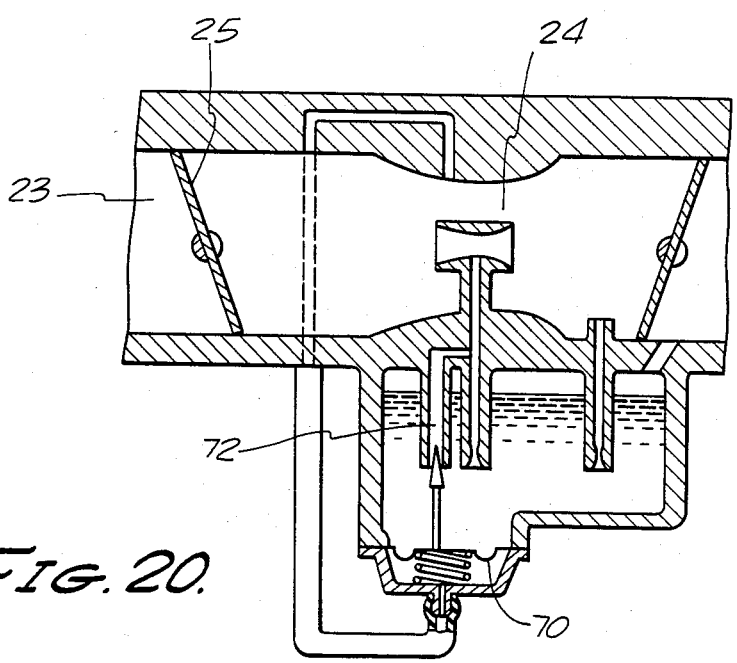
FIG. 20 is a side elevation of another embodiment of a carburetor shown in FIG. 1.

Rich mixture obtained from the first mixture source 21 generally has an air-fuel ratio of not less than 7, and the lean mixture obtained from the second mixture source 24 generally has an air-fuel ratio of not more than 30. If needed, one or the other of the mixture sources may be constructed as shown in FIG. 20 and FIG. 19, for instance, and may be of the type that regulates the air-fuel ratios in proportion to the increase of air flow as shown by $G_1$ and $G_2$ in FIG. 13, for example.

Figure 10:
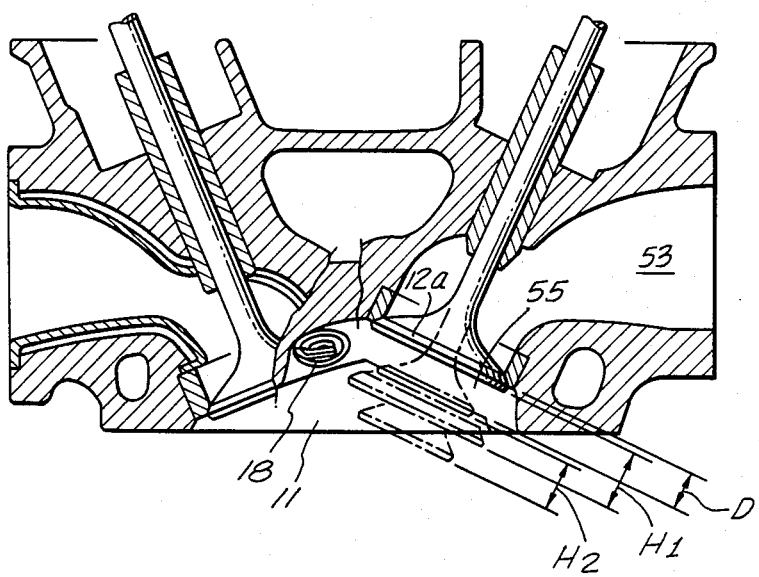
FIG. 10 is a sectional elevation of the device shown in FIG. 9.
Figure 12:
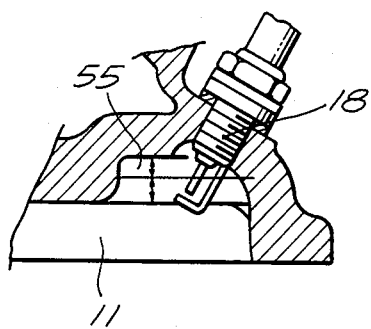
FIG. 12 is a sectional detail showing the spark plug mounting.

As shown in FIGS. 9 and 10, the combustion chamber 11 may be of the type having a cavity 55 in the upper portion thereof, with the first intake valve port 53 and the electrode of the spark plug 18 inside the cavity 55. In this way the rich mixture is sure to be ignited by the spark plug 18 in the cavity 55. it is preferred that the maximum lift $H_1$ of the first intake valve 12 be greater than the depth D of the cavity 55. Thus, $H_1 > D$. When the valve 12a is open, it tends to cover the mouth of the cavity 55 to minimize diffusion of the rich mixture in the cavity 55. Furthermore, the electrode of the spark plug 18 may be located in proximity to the boundary line between the cavity 55 and the combustion chamber 11, as shown in FIG. 12, for better cooling of the spark plug electrode.

Figure 14:
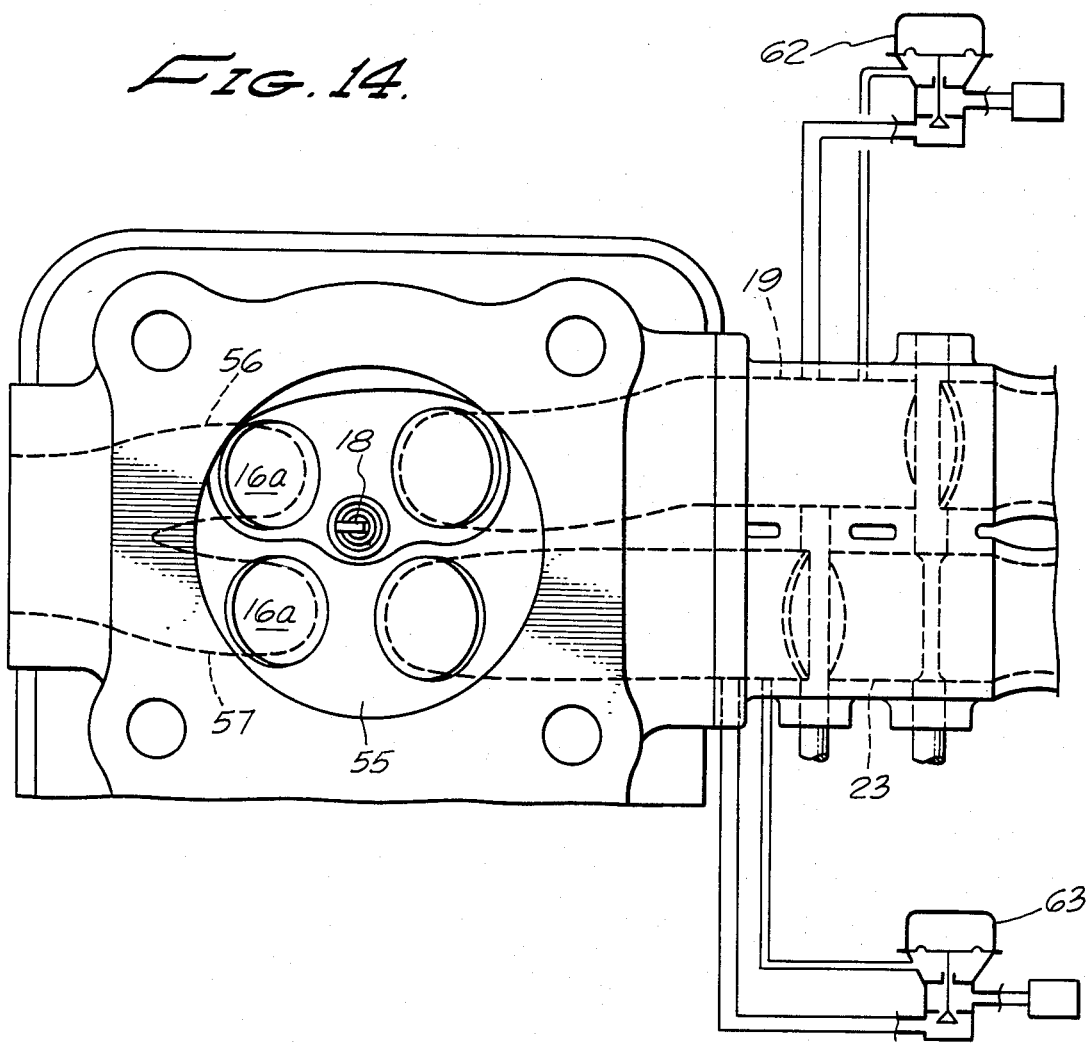
FIG. 14 is a view similar to FIG. 1 showing another modification.
Figure 15:
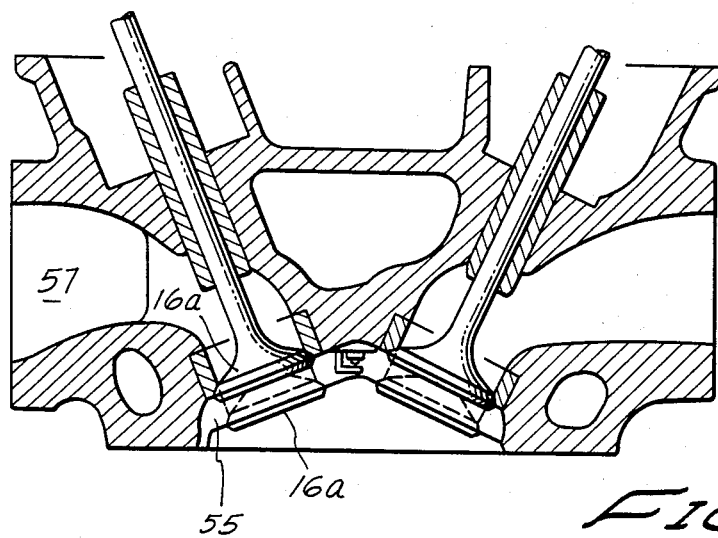
FIG. 15 is a sectional side elevation of the device shown in FIG. 14.
Figure 16:
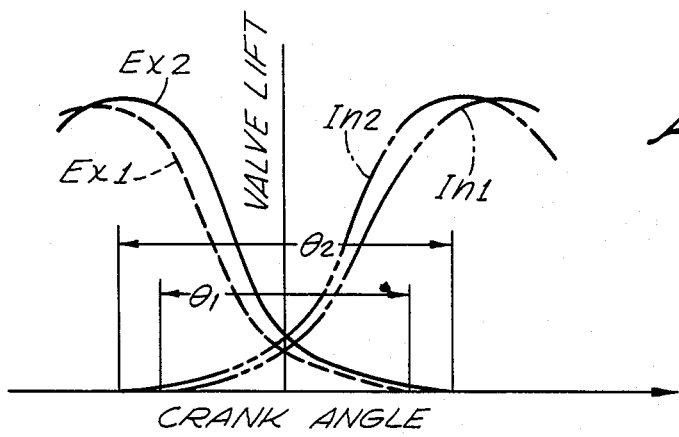
FIG. 16 is a graph showing valve opering characteristics of the device of FIGS. 14 and 15.

In accordance with the modified form of the invention shown in FIGS. 14 and 15, two exhaust valve ports 56 and 57 are provided, closed by exhaust valves 16a and 16b, the former being placed inside the cavity 55. In this case the opening characteristics of the intake and the exhaust valve inside the cavity 55 are as shown in FIG. 16 by $In_1$ and $Ex_1$, for instance, and it is preferred that the overlap $\theta_1$ of the former and the overlap $\theta_2$ of the latter have the relationship $\theta_1 < \theta_2$. In this case, each characteristic curve or lift curve is symmetrical with respect to the top dead center, as shown in the same figure.

Figure 17:
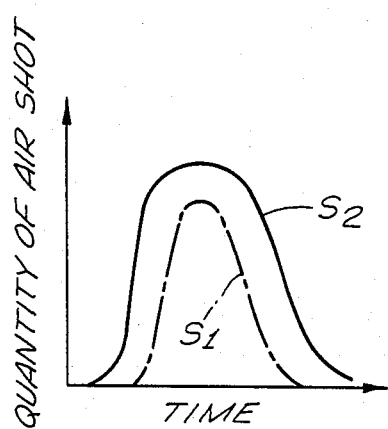
FIG. 17 is a diagram showing operation of air valves.

Furthermore, in an engine embodying this invention, as shown in FIG. 1, for instance, it is possible to provide an evaporative fuel absorber 59 of canister type connected to the fuel tank, not shown. The absorber 59 is connected through valve 60 and conduit 61 to the second intake port 15. A first air valve 62 and a second air valve 63 operate at a minus load of the engine and act to supply small quantities of air to the first intake passage 19 and large quantities of air to the second intake passage 23. In this case, the duration of each opening of the first air valve 62 is shorter as compared with that of the second air valve 63. This is shown in FIG. 17 by $S_1$ and $S_2$. Also, the engine 10 may be of the exhaust gas recirculation type, as shown in FIG. 1, in which the exhaust passageway 64 extends from the exhaust passage 17 through the First intake passage 19. A control valve 65 is positioned in the passageway 64.

FIG. 19 illustrates a pneumatic type carburetor. The diaphragm 70 moves upwardly upon vacuum increase in the intake passage 19. This movement of diaphragm 70 results in making the air-fuel mixture lean by closing the path 72 in the main jet. FIG. 20 illustrates a pneumatic type carburetor which acts in the opposite manner to the one shown in FIG. 19. In the embodiment shown in FIG. 20 diaphragm 70 moves downwardly upon vacuum increase in the intake passage 23. This movement of the diaphragm 70 results in making the air-fuel mixture richer by opening the path 72 in the main jet.

It will be understood from the foregoing, that in accordance with this invention, introduction of rich mixture into the combustion chamber may be accomplished in relatively small quantities and at low speed, and to have the rich mixture retained in a particular portion of the combustion chamber to prevent it from diffusing, so that a stable stratified combustion is accomplished. The pollutants HC, CO and $NO_x$ in the exhaust emissions are reduced, and the indicated specific fuel consumption is improved.

Having fully described our invention, it is to be understood that wer are not to be limited to the details herein set forth but that our invention is of the full scope of the appended claims.

We claim:

1. In an internal combustion piston engine, the improvement comprising, in combination: walls forming a combustion chamber having first and second intake valve ports and at least one exhaust valve port, a first intake valve for controlling flow through the first intake valve port, a second intake valve for controlling flow through the second intake valve port, an exhaust valve for controlling flow through the exhaust valve port, a spark plug communicating with said combustion chamber, means including a first intake passage for supplying a relatively rich air-fuel mixture to said first intake valve port, means including a second intake passage for supplying a relatively lean air-fuel mixture to said second intake valve port, a first throttle valve in said first intake passage, a second throttle valve in said second intake passge, a first and a second air valve that operate at a minus load of said engine and which introduce by said first air valve a relatively small amount of air into said first intake passage and by said second air valve a relatively large amount of air into said second intake passage, means for controlling operation of said first and second throttle valves so that during an intake stroke of the engine the air weight introduced into the combustion chamber through the first intake valve port is less than the air weight introduced into the combustion chamber through the second intake valve port, and so that the following relationship exists at least in the range of low loads of the engine:

$$A_{TH1}/A_{V1} < A_{TH2}/A_{V2}$$

where $A_{TH1}$: effective opening area of said first throttle valve at each load.

$A_{TH2}$: effective opening area of said second throttle valve at each load.

$A_{V1}$: effective sectional area of said first intake valve port.

$A_{V2}$: effective sectional area of said second intake valve port.

2. The combination set forth in claim 1 in which the first and second intake valve ports are of different sizes and the effective sectional area of said first intake valve port as compared to the effective sectional area of the second intake valve port is approximately equal to the minimum effective sectional area of the first intake passage as compared to the minimum effective sectional area of the second intake passage.

3. An internal combustion engine as claimed in claim 1 in which:

$$A_{V1} > A_{V2}.$$

4. An internal combustion engine as claimed in claim 1 in which:

$$25\% < \frac{G_1}{G_1 + G_2} \times 100 < 50\%$$

where:

$G_1$: air weight introduced into said combustion chamber through said first intake passage during the intake stroke of said engine.

$G_2$: air weight introduced into said combustion chamber through said second intake passage during the intake stroke of said engine.

5. An internal combustion engine as claimed in claim 1 in which a peripheral enclosure in the combustion chamber is formed around said spark plug and at least one opening is provided therein.

6. An internal combustion engine as claimed in claim 1 in which said first intake valve is opened before top dead center and after opening of said second intake valve.

7. An internal combustion engine as claimed in claim 1 in which the air-fuel ratio of mixture supplied in said first intake passage is not less than 7.

8. An internal combustion engine as claimed in claim 1 in which the air-fuel ratio of mixture supplied in said second intake passage is not more than 30.

9. An internal combustion engine as claimed in claim 1 having a second mixture source of the type increasing mixture concentration in proportion to the increase of intake air weight.

10. An internal combustion engine as claimed in claim 1 in which an evaporative fuel absorber connected to a fuel tank is provided and connected to said second intake passage.

11. The combination set forth in claim 1 in which the combustion chamber, the intake and exhaust ports and the intake and exhaust valves are all positioned in a cylinder head of the engine.

12. An internal combustion engine as claimed in claim 1 in which a cavity is formed in a wall of said combustion chamber, said first intake valve port and the electrode of said spark plug are located inside said cavity, and the maximum lift of said first intake valve is greater than the depth of said cavity.

13. An internal combustion engine as claimed in claim 12 in which the electrode of said spark plug is located in proximity to the boundary line between said cavity and said combustion chamber.

14. An internal combustion engine as claimed in claim 12 in which said maximum lift of said first intake valve is greater than the maximum lift of said second intake valve.

15. An internal combustion engine as claimed in claim 12 in which said first intake valve is opened after the opening of said second intake valve.

16. An internal combustion engine as claimed in claim 12 in which two exhaust valve ports are provided, with one of them being located inside said cavity.

17. An internal combustion engine as claimed in claim 16 in which the overlap between the intake valve and the exhaust valve inside said cavity is less than the overlap between the intake valve and the exhaust valve outside said cavity.

18. An internal combustion engine as claimed in claim 17 in which the lift curves of the intake and the exhaust valve inside said cavity and the lift curves of the intake and the exhaust valve outside said cavity are symmetrical with respect to top dead center, respectively.

* * * * *